United States Patent

Inoue et al.

[11] Patent Number: 5,997,776
[45] Date of Patent: Dec. 7, 1999

[54] COLOR LAYER COMPOSITION FOR CHROMATIC DEVICE AND METHOD OF PRODUCING CHROMATIC DEVICE BY USING SAME

[75] Inventors: Toshiki Inoue; Yoshifumi Kato; Hisashi Shiraki; Takanori Murasaki, all of Kariya, Japan

[73] Assignee: Kabushiki Kaisha Toyoda Jidishokki Seisakusho, Aichi, Japan

[21] Appl. No.: 09/118,769

[22] Filed: Jul. 18, 1998

Related U.S. Application Data

[62] Division of application No. 08/649,066, May 16, 1996, Pat. No. 5,851,439, which is a continuation of application No. 08/295,241, Aug. 24, 1994, abandoned.

[30] Foreign Application Priority Data

Aug. 25, 1993 [JP] Japan .................................. 5-210280
Apr. 28, 1994 [JP] Japan .................................. 6-092453

[51] Int. Cl.⁶ .............................. G02F 1/15; G02F 1/155
[52] U.S. Cl. ........................ 252/583; 252/586; 359/268; 359/270; 359/273
[58] Field of Search ..................... 252/582, 583, 252/584, 586; 359/265, 268, 270, 273

[56] References Cited

U.S. PATENT DOCUMENTS

| | | | |
|---|---|---|---|
| 5,252,354 | 10/1993 | Cronin et al. | 427/58 |
| 5,352,504 | 10/1994 | Boulanger et al. | 428/216 |
| 5,404,244 | 4/1995 | Van Dine et al. | 359/270 |
| 5,442,478 | 8/1995 | Lampert et al. | 359/273 |
| 5,457,218 | 10/1995 | Cronin et al. | 556/44 |
| 5,524,264 | 6/1996 | Cronin et al. | 252/583 |
| 5,851,439 | 12/1998 | Inoue et al. | 252/586 |

*Primary Examiner*—Shean C. Wu
*Attorney, Agent, or Firm*—Morgan & Finnegan, L.L.P.

[57] ABSTRACT

A coloring layer composition for a chromatic device of the present invention contains an oxide such as tungsten oxide or niobium oxide and so on as a solute, water and an organic solvent such as propanol. In the step of forming a reduction coloring layer, a film is formed by using a peroxotungstic acid solution containing 100 parts by weight of $WO_3 \cdot aNb_2O_5 \cdot bH_2O_2 \cdot cH_2O$ (wherein a, b and c are each a positive number) as a solute, 20 to 120 parts by weight of water and 80 to 800 parts by weight of n-propanol as an organic solvent. At this time, a dip coating method is used, and the vertical pulling-up speed is less than 15 cm/min. The present invention can effectively prevent unevenness and separation of the reduction coloring layer.

2 Claims, 5 Drawing Sheets

COLOR LAYER COMPOSITION FOR CHROMATIC DEVICE AND METHOD OF PRODUCING CHROMATIC DEVICE BY USING SAME

This application is a division of application Ser. No. 08/649,066 filed on May 16,1996 now U.S. Pat. No. 5,851, 439, which is a continuation of application Ser. No. 08/295, 241 filed on Aug. 24, 1994 (now abandoned).

BACKGROUND OF THE INVENTION

The present invention relates to a coloring layer composition for a chromatic device, and a method of producing a chromatic device by using the composition. The composition can be used in, for example, a coloring layer formation process for forming a reduction coloring layer of an electrochromatic (EC) device.

A known chromatic device, e.g., EC device, comprises a first transparent substrate 1, a first electrode layer 2, a reduction coloring layer 3, an electrolyte layer 4, an oxidation coloring layer 5, a second transparent electrode layer 6 and a second transparent substrate 7, which are successively laminated as shown in FIG. 1. In this EC device, when a current higher than the determined threshold value is applied between the first electrode layer 2 and the second electrode layer 6, oxidation and reduction reactions take place in the vicinities of the interfaces between the first electrode layer 2 and the reduction coloring layer 3 and between the second electrode layer 6 and the oxidation coloring layer 5 to obtain a reversible coloration-bleaching change.

In the EC device, tungsten oxide ($WO_3$) can be used for the reduction coloring layer 3. Known methods of forming the reduction coloring layer 3 comprising $WO_3$ include general dry methods such as a sputtering method and an evaporation method, a spin coating method for forming a film by using a peroxotungstic acid solution as disclosed in "Applied Physics" No. 61, Vol. 3 (1992) (pp. 226–269), and a dip coating method for forming a film by using the some peroxotungstic acid solution. Other known methods of forming the reduction coloring layer in the EC device include methods using a solution containing an organic compound of W, as disclosed in Japanese Patent Laid-Open Nos. 56-38379, 61-36292, 61-123691 and 62-112132.

However, if a dry method such as a sputtering or evaporation method is performed, a large vacuum apparatus is required for obtaining a large-area EC device, thereby increasing the production cost. Particularly, if the sputtering method is executed, since the temperature of the substrate used is increased, a glass substrate can be used, but a resin substrate cannot, thereby hindering the light weight properties of the EC device.

Even if the spin coating method is performed, the coloring layer can be obtained without an increase in the production costs only when a substrate of about 30 cm square is rotated, and thus larger EC device cannot be produced at low cost.

It thus seems practically effective when producing a large EC device at low cost to perform the dip coating method. Wet methods such as printing methods, spray methods, spin coating methods and so on other than the dip coating method also seem to be practically effective.

However, the results of the tests performed by the inventors showed that the wet dip coating method causes wave-like flows in the film after pulling up the substrate, and thus causes unevenness in the reduction coloring layer formed by drying the film as is. Particularly, if the peroxotungstic acid solution is used in the dip coating method, bubbles occur in the film due to the generation of oxygen caused by the decomposition reaction of the hydrogen peroxide contained in the solution, and the release of the oxygen dissolved therein during the dipping and pulling-up of the substrate. If the film is dried as is, unevenness occurs in the reduction coloring layer formed. Since the unevenness in the reduction coloring layer can be visually confirmed, and as it causes unevennes in the transmittance of the EC device during coloring, quality problems arise.

In addition, although a uniform film can be formed immediately after pulling up the substrate, heat treatment of the film in post-processing causes cracks in the reduction coloring layer and in turn separation of the layer. The cracks and separation bring about contact between the electrolyte layer and the first electrode layer of the EC device, thereby causing quality problems due to deterioration or dissolution of the first electrode layer. If a large EC device is produced, unevenness in or separation of the reduction coloring layer is particularly conspicuous, and utility thus significantly deteriorates. A wet method using a solution containing an organic compound of tungsten has the drawback that preparation of the organic compound is troublesome.

The above drawbacks apply to not only the EC device but also other chromatic devices such as thermochromatic devices, photochromatic devices and so on which have a coloring layer comprising an oxide of at least one of W, Nb, Mo and V.

The present invention has been achieved in consideration of the above actual conditions, and an object of the present invention is to permit reliable production of a large chromatic device at low cost.

Another object of the present invention is to provide a novel coloring layer composition used for forming a reduction coloring layer of a chromatic device.

A further object of the present invention is to provide a high-quality chromatic device on which a coloring layer is formed by using the above composition under specified conditions so as to prevent unevennes in and separation of the coloring layer.

As a result of intensive studies performed by the inventors for solving the above problems, it was found that the mixing of an organic solvent with a coloring layer forming composition is effective for decreasing the surface energy of the film formed and effective in preventing unevenness in and separation of the film. It was also found that the organic solvent can prevent oxygen from generating due to the decomposition of hydrogen peroxide, and in prevent the dissolved oxygen from being released. The organic solvent is required to have compatibility with water because a solute comprising an oxide of at least one of W, Nb, Mo and V is dissolved in water, and to be evaporated by heat treatment of the film. This resulted in the achievement of the present invention. It was further found that a film of a coloring layer without unevenness or separation can be formed by employing a dip coating method and vertically pulling up the treated substance at a low speed.

SUMMARY OF THE INVENTION

The present invention provides a coloring layer composition for a chromatic device comprising a solute comprising an oxide of at least one of W, Nb, Mo and V, water for dispersing and holding the solute, and an organic solvent compatible with water.

The present invention also provides a coloring layer composition for a chromatic device comprising as a solute a tungsten oxide-containing compound represented by the formula $WO_3 \cdot aNb_2O_5 \cdot bH_2O_2 \cdot cH_2O$ (wherein a, b and c are each zero or a positive number).

The present invention further provides a coloring layer composition for a chromatic device comprising a peroxotungstic acid solution containing as a solute 100 parts by weight of $WO_3 \cdot aNb_2O_5 \cdot bH_2O_2 \cdot cH_2O$ (wherein a, b and c are each a positive number), 20 to 120 parts by weight of water and 80 to 800 parts by weight of propanol as an organic solvent.

The present invention further provides a method of producing a chromatic device having a first transparent substrate, a first transparent electrode layer, a reduction coloring layer, an electrolyte layer, an oxidation coloring layer, a second transparent electrode layer and a second transparent substrate, which are successively laminated, the method comprising the step of forming the reduction coloring layer on the first transparent electrode layer. The reduction coloring layer forming step employs a dip coating method for forming a film on the first transparent electrode layer by using the above coloring layer composition, the vertical pulling-up speed being less than 15 cm/min.

DESCRIPTION OF THE PREFERRED EMBODIMENTS

Figure 1:
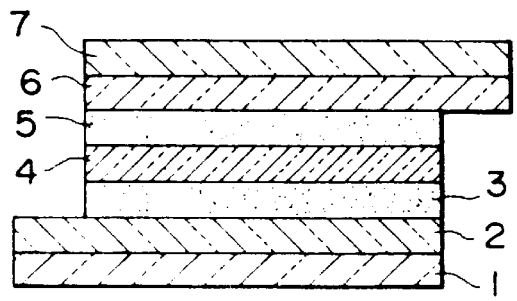
FIG. 1 is a schematic sectional view illustrating an EC device.

A coloring layer composition of the present invention contains a solute consisting of an oxide of at least one of W, Nb, Mo and V, water for dispersing and holding the solute and an organic solvent compatible with water. The organic solvent decreases the surface energy of the film formed and thus effectively prevents unevenness and separation of the coloring layer. The organic solvent compatible with water does not interfere with dissolution of the solute in water and is evaporated by heat treatment of the film.

Examples of the solute include tungsten oxide (for example, $WO_3$), niobium oxide (for example, $Nb_2O_5$), molybdenum oxide (for example, $Mo_2O_5$), vanadium oxide (for example, $V_2O_5$) and a mixture or complex of these oxides. Preferred examples of the solute are tungsten oxide-containing compounds represented by the following formula:

$WO_3 \cdot aNb_2O_5 \cdot bH_2O_2 \cdot cH_2O$ (wherein a, b and c are each zero or a positive number)

Of these compounds, compounds in which a, b and c are each a positive number are more preferred. The compounds are heteropolyacids obtained by treating powders of tungsten and niobium metals or metal compounds with hydrogen peroxide. The compound is referred to as "peroxotungstic acid" hereinafter. Although a solution of the peroxotungstic acid easily produces bubbles due to the hydrogen peroxide contained therein, the organic solvent compatible with water can prevent oxygen from generating due to the decomposition of hydrogen peroxide, and can prevent the dissolved oxygen from being released.

Furthermore, compounds represented by the formulae: $WO_3 \cdot aMoO_2 \cdot bH_2O_2 \cdot cH_2O$; $MoO_2 \cdot aNb_2O_5 \cdot bH_2O_2 \cdot cH_2O$; $WO_3 \cdot aNb_2O_5 \cdot bMoO_2 \cdot cH_2O_2 \cdot dH_2O$; and $V_2O_5 \cdot aH_2O_2 \cdot bH_2O$; (wherein a, b and c and d each zero or a positive number), may be used as a solute.

In the composition of the present invention, water and an organic solvent are used as solvents. Examples of suitable organic solvents which are soluble or compatible with water and capable of inhibiting decomposition of hydrogen peroxide and/or retarding the release of dissolved oxygen include: alcohols, preferably alkyl alcohols, such as the lower ($C_1$–$C_5$); oxygenated derivatives of alcohols such as alkoxy alkanols, e.g., 2-ethoxyethanol; dialkyl amides such as dialkyl alkamides, e.g., dimethyl formamide.

The amount of the solute present in the composition of the present invention is 50% by weight, preferably 20 to 30% by weight, of the total amount of the composition.

The amount of the organic solvent used is 80 parts by weight, preferably 80 to 800 parts by weight, relative to 100 parts by weight of the solute.

A preferred coloring layer composition according to the present invention comprises 100 parts by weight of $WO_3 \cdot aNb_2O_5 \cdot bH_2O_2 \cdot cH_2O$ (wherein a, b and c are each zero or a positive number) as a solute, not more than 120 parts by weight, preferably 20 to 120 parts by weight, of water, and at least 80 parts by weight, preferably 80 to 800 parts by weights of propanol as the organic solvent. The use of the composition can effectively prevent unevenness in and separation of the coloring layer.

The method of producing an EC device by using the coloring layer composition of the present invention employs the dip coating method in a portion of the reduction coloring layer forming step. Namely, a film is formed on a first transparent electrode layer by using a peroxotungstic acid solution. The solvent is removed from the film by heat treatment to form a reduction coloring layer comprising $WO_3 \cdot aNb_2O_5 \cdot bH_2O_2 \cdot cH_2O$ (wherein a, b and c are each zero or a positive number) as a solute.

As a result of tests performed by the inventors, it became clear that unevenness occurs in the reduction coloring layer due to a wave-like flow of the film after vertically pulling the substrate up from the peroxotungstic acid solution under the conditions of low concentration of the solution (also low viscosity) and a high pulling-up speed, which causes adhesion of a large amount of solution.

Under the conditions of high concentration and high pulling-up speed, wihich cause the formation of a thick film, cracks occur in the reduction coloring layer. It seems that when the film thickness is increased, cracks can occur due to an increase in the internal stress of the film during heat treatment. This is liable to produce separation of the film.

It is thus effective for preventing the generation of unevenness and separation that the solute concentration of the coloring layer forming composition be less than 50% by weight, preferably 20 to 30% by weight, and the vertical pulling-up speed less than 15 cm/min, preferably less than 10 cm/min.

EXAMPLES

Although the present invention is described in detail below with reference to an example and test examples, the present invention is not limited to these examples.
(Preparation of coloring layer composition)

The EC device shown in FIG. 1 as an example of chromic devices was produced by using an example of a reduction coloring layer composition. The EC device is characterized by the reduction coloring layer composition, and thus has the same appearance as that of a conventional device.

First, the reduction coloring layer composition (peroxotungstic acid solution) was obtained. That is, 0.18 mole of tungsten powder and 0.015 mole of niobium carbide powder were dissolved in 200 ml of 15% hydrogen peroxide aqueous solution. The resultant solution was then dried under a reduced pressure to synthesize a powder of $WO_3.0.041 Nb_2O_6.0.6H_3O_3.3H_2O$ (referred to as "IPA powder" hereinafter). The IPA powder was dissolved in pure water to obtain a solution containing the IPA powder. The thus-formed solution contained 100 parts by weight of IPA powder as a solute and 24 parts by weight of water.

The solution was diluted with n-propanol to obtain a peroxotungstic acid solution containing the IPA powder. The resultant peroxotungstic acid solution contained 100 parts by weight of IPA powder as a solute, 24 parts by weight of water and 230 parts by weight of n-propanol.

(Production of EC device)

The EC device was produced by the following method: A PET transparent resin film (5 cm×5 cm) was used as first and second transparent substrates 1 and 7. ITO (indium tin oxide ($In_2O_3.SnO_2$)) was deposited on the surfaces of the first and second transparent substrates 1 and 7 to form first and second electrode layers 2 and 6, respectively, comprising ITO. In this way, a multiple first ITO film comprising the first transparent substrate and the first electrode layer 2, and a multiple second ITO film comprising the second transparent substrate 7 and the second electrode layer 6 were obtained.

The first ITO film was then dipped in the peroxotungstic acid solution, and then vertically pulled up at a pulling-up speed of 0 to 10 cm/mn. In this way, a film was formed by the dip coating method, In this case, no wave-like flows occurred in the film after pulling it up.

The first ITO film on which the film was formed was then subjected to heat treatment at 120° C. for 1 hour for removing moisture from the film to form a reduction coloring layer 3 comprising $WO_3.0.041 Nb_2O_5$ on the first electrode layer 2. No unevenness, cracking or separation occurred in the reduction coloring layer 3.

The first ITO film was dipped in a $LiCF_3SO_3$.propylene carbonate (PC) solution to inject Li ion in the $WO_3.0.041 Nb_3O_5$.

Meanwhile, a Prussian blue ($Fe^{2+}[Fe^{3+}(CN)_6^{3-}]$) was deposited on the second electrode layer 6 of the second ITO film which was washed with alkali, by an electrolytic synthetic method to form an oxidation coloring layer 5 comprising the Prussian blue film.

An electrolyte solution was prepared by dissolving a supporting salt ($LiCF_3SO_4$) and a photopolymerization initiator (2,2-dimethoxy-2-phenylacetophenone) in polyethylene oxide, and coated on the oxidation coloring layer 5 of the second ITO film.

The reduction coloring layer 3 of the first ITO film and the electrolyte solution on the second ITO film were bonded, and then irradiated with ultraviolet rays (UV) for curing the electrolyte solution to form an electrolyte layer 4 from the electrolyte solution.

It was confirmed that the thus-obtained EC device produced excellent reversible coloration-bleaching changes.

Accordingly, the reduction coloring layer composition (peroxotungstic acid solution) of the present invention of the example can effectively prevent the occurrence of unevenness and separation in the reduction coloring layer formed by the dip coating method, thereby making it possible to reliably produce a large EC device at low cost.

(Test 1)

An optimum composition range of the reduction coloring layer composition (peroxotungstic acid solution) was determined.

First, an IPA powder was synthesized by the same method as that employed in the Example. The IPA powder was then dissolved in pure water to obtain each of the solutions A to G having the compositions in parts by weight shown in TABLE 1.

TABLE 1

| Solution No. | A | B | C | D | E | F | G |
|---|---|---|---|---|---|---|---|
| IPA (parts by weight) | 100 | 100 | 100 | 100 | 100 | 100 | 100 |
| Water (parts by weight) | 20 | 24 | 40 | 60 | 80 | 100 | 120 |

Figure 2:
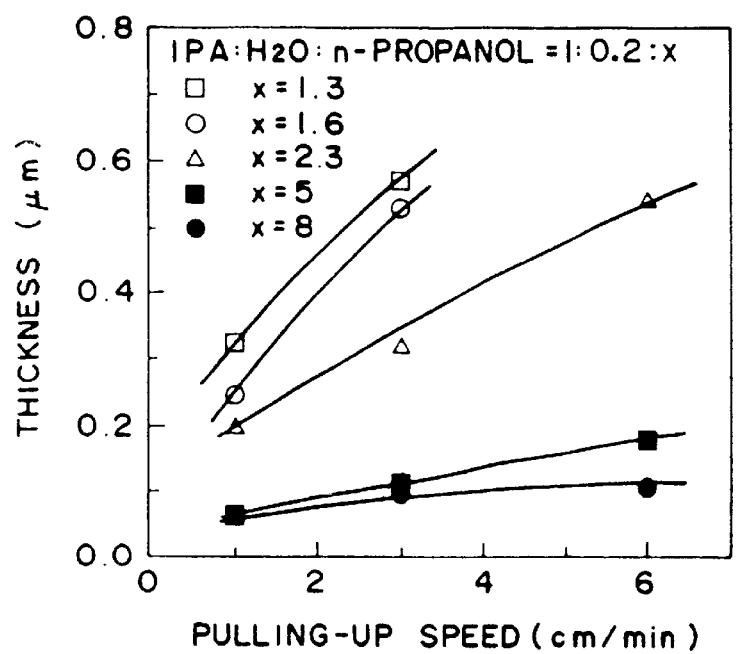
FIGS. 2 to 9 are graphs each illustrating the relation between the pulling-up speed and the thickness of a film when it is formed on a first electrode layer by using a coloring layer composition (8 types having different compositions) of the present invention.

Solution A was diluted with the amounts of n-propanol shown in TABLE 2 to obtain the peroxotungstic acid solutions No. 1 to No. 10. TABLE 2 also shows the relation between the pulling-up speed (cm/min) and the state of the reduction coloring layer when each of the peroxotungstic acid solutions No. 1 to No. 10 was used in the dip coating method. The other conditions were the same as those employed in the Example (the same applies hereinafter). In TABLE 2, the mark ○ indicates that an excellent reduction coloring layer was formed, Δ indicates that cissing occured in the reduction coloring layer, ▲ indicates that unevenness occured in the reduction coloring layer, and x indicates that separation occured in the reduction coloring layer (the same applies hereinafter). FIG. 2 shows the relation between the pulling-up speed (cm/min) and the thickness of the reduction coloring layer ($\mu$m) when some of the peroxotungatic acid solutions were used in the dip coating method.

TABLE 2

| Solution No. | 1 | 2 | 3 | 4 | 5 | 6 | 7 | 8 | 9 | 10 |
|---|---|---|---|---|---|---|---|---|---|---|
| Amount of n-propanol (parts by weight) | 40 | 80 | 100 | 130 | 160 | 230 | 280 | 400 | 500 | 800 |
| Pulling-up rate | | | | | | | | | | |
| 1 cm/min. | X | ○ | ○ | ○ | ○ | ○ | ○ | ○ | ○ | ○ |
| 3 cm/min. | X | X | ○ | ○ | ○ | ○ | ○ | ○ | ○ | ○ |
| 6 cm/min. | X | X | ○ | ○ | ○ | ○ | ○ | ○ | ○ | ○ |

Figure 3:
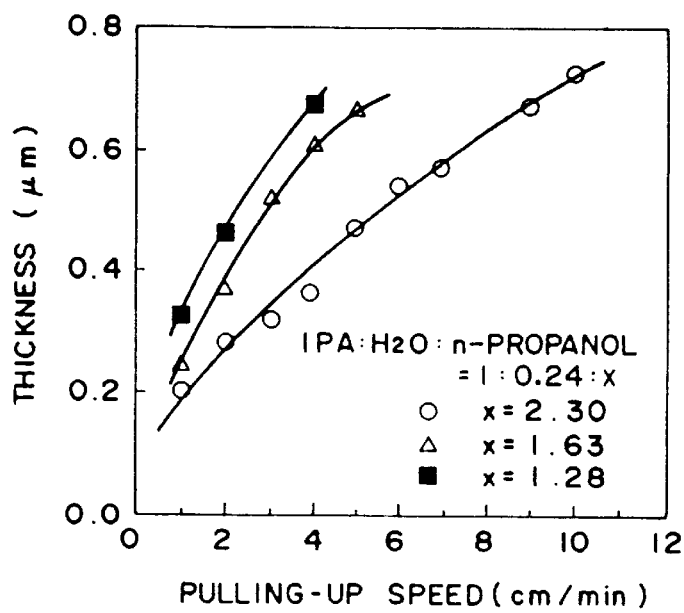

Solution B was diluted with the amounts of n-propanol shown in TABLE 3 to obtain the peroxotungstic acid solutions No. 11 to No. 17. TABLE 3 also shows the relation between the pulling-up speed (cm/min) and the state of the reduction coloring layer when each of the peroxotungstic acid solutions No. 11 to No. 17 was used in the dip coating method. FIG. 3 shows the relation between the pulling-up speed (cm/min) and the thickness of the reduction coloring layer ($\mu$m) when some of the peroxotungstic acid solutions were used in the dip coating method.

TABLE 3

| Solution No. | 11 | 12 | 13 | 14 | 15 | 16 | 17 |
|---|---|---|---|---|---|---|---|
| Amount of n-propanol (parts by weight) Pulling-up rate | 40 | 80 | 100 | 130 | 160 | 230 | 280 |
| 1 cm/min. | X | ○ | ○ | ○ | ○ | ○ | ○ |
| 3 cm/min. | X | X | ○ | ○ | ○ | ○ | ○ |
| 6 cm/min. | X | X | ○ | ○ | ○ | ○ | ○ |

Figure 4:
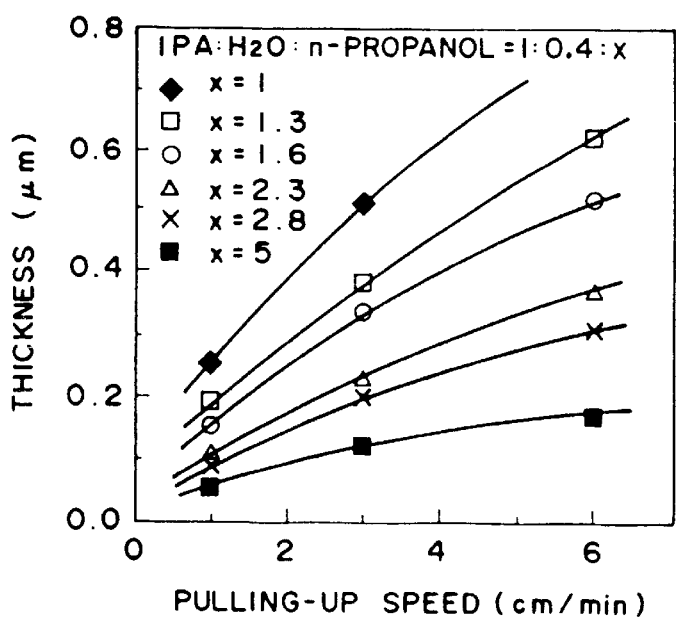

Solution C was diluted with the amounts of n-propenol shown in TABLE 4 to obtain the peroxotungstic acid solutions No. 18 to No. 27. TABLE 4 also shows the relation between the pulling-up speed (cm/min) and the state of the reduction coloring layer when each of the peroxotungstic acid solutions No. 18 to No. 27 was used in the dip coating method. FIG. 4 shows the relation between the pulling-up speed (cm/min) and the thickness of the reduction coloring layer ($\mu$m) when some of the peroxotungstic acid solutions were used in the dip coating method.

TABLE 4

| Solution No. | 18 | 19 | 20 | 21 | 22 | 23 | 24 | 25 | 26 | 27 |
|---|---|---|---|---|---|---|---|---|---|---|
| Amount of n-propanol (parts by weight) Pulling-up rate | 40 | 80 | 100 | 130 | 160 | 230 | 280 | 400 | 500 | 800 |
| 1 cm/min. | ○ | ○ | ○ | ○ | ○ | ○ | ○ | ○ | ○ | ○ |
| 3 cm/min. | △▲ | ○ | ○ | ○ | ○ | ○ | ○ | ○ | ○ | ○ |
| 6 cm/min. | △▲ | ▲ | ○ | ○ | ○ | ○ | ○ | ○ | ○ | ○ |

Figure 5:
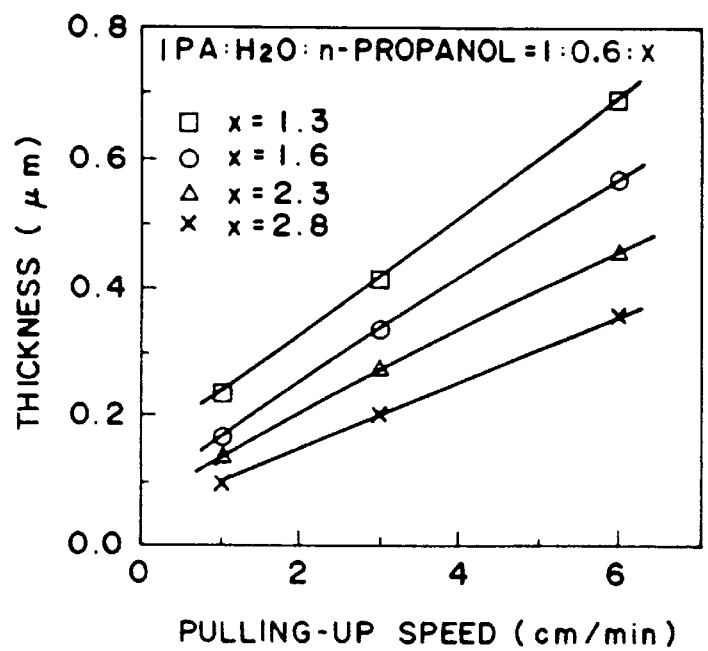

Solution D was diluted with the amounts of n-propanol shown in TABLE 5 to obtain the peroxotungstic acid solutions No. 28 to No. 37. TABLE 5 also shows the relation between the pulling-up speed (cm/min) and the state of the reduction coloring layer when each of the peroxotungstic acid solutions No. 28 to No. 37 was used in the dip coating method. FIG. 5 shows the relation between the pulling-up speed (cm/min) and the thickness of the reduction coloring layer ($\mu$m) when some of the peroxotungstic acid solutions were used in the dip coating method.

TABLE 5

| Solution No. | 28 | 29 | 30 | 31 | 32 | 33 | 34 | 35 | 36 | 37 |
|---|---|---|---|---|---|---|---|---|---|---|
| Amount of n-propanol (parts by weight) Pulling-up rate | 40 | 80 | 100 | 130 | 160 | 230 | 280 | 400 | 500 | 800 |
| 1 cm/min. | △▲ | ○ | ○ | ○ | ○ | ○ | ○ | ○ | ○ | ○ |
| 3 cm/min. | △▲ | ▲ | ○ | ○ | ○ | ○ | ○ | ○ | ○ | ○ |
| 6 cm/min. | △▲ | △▲ | ▲ | ○ | ○ | ○ | ○ | ○ | ○ | ○ |

Figure 6:
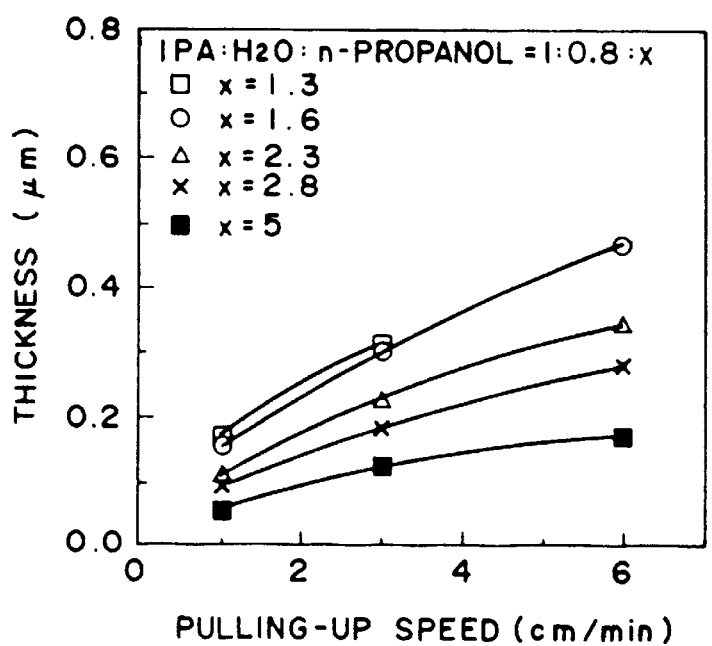

Solution E was diluted with the amounts of n-propanol shown in TABLE 6 to obtain the peroxotungstic acid solutions No. 38 to No. 47. TABLE 6 also shows the relation between the pulling-up speed (cm/min) and the state of the reduction coloring layer when each of the peroxotungstic acid solutions No. 38 to No. 47 was used in the dip coating method. FIG. 6 shows the relation between the pulling-up speed (cm/min) and the thickness of the reduction coloring layer ($\mu$m) when some of the peroxotungstic acid solutions were used in the dip coating method.

TABLE 6

| Solution No. | 38 | 39 | 40 | 41 | 42 | 43 | 44 | 45 | 46 | 47k |
|---|---|---|---|---|---|---|---|---|---|---|
| Amount of n-propanol (parts by weight) | 40 | 80 | 100 | 130 | 160 | 230 | 280 | 400 | 500 | 800 |

TABLE 6-continued

| Solution No. | 38 | 39 | 40 | 41 | 42 | 43 | 44 | 45 | 46 | 47k |
|---|---|---|---|---|---|---|---|---|---|---|
| Pulling-up rate | | | | | | | | | | |
| 1 cm/min. | ΔΆ | ΔΆ | ○ | ○ | ○ | ○ | ○ | ○ | ○ | ○ |
| 3 cm/min. | ΔΆ | ΔΆ | ▲ | ○ | ○ | ○ | ○ | ○ | ○ | ○ |
| 6 cm/min. | ΔΆ | ΔΆ | ΔΆ | ▲ | ▲ | ○ | ○ | ○ | ○ | ○ |

Figure 7:
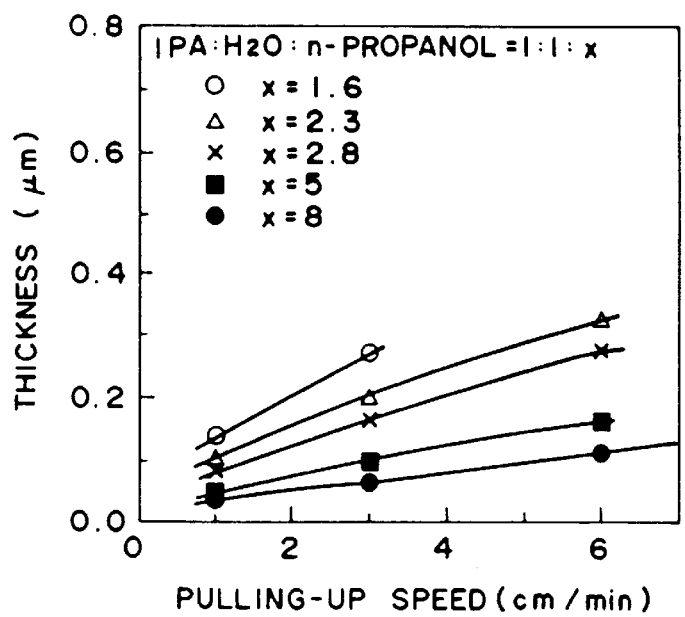

Solution F was diluted with the amounts of n-propanol shown in TABLE 7 to obtain the peroxotungstic acid solutions 48 to 57. TABLE 7 also shows the relation between the pulling-up speed (cm/min) and the state of the reduction coloring layer when each of the peroxotungstic acid solutions No. 48 to No. 57 was used in the dip coating method. FIG. 7 shows the relation between the pulling-up speed (cm/min) and the thickness of the reduction coloring layer ($\mu$m) when some of the peroxotungstic acid solutions were used in the dip coating method.

TABLE 7

| Solution No. | 48 | 49 | 50 | 51 | 52 | 53 | 54 | 55 | 56 | 57 |
|---|---|---|---|---|---|---|---|---|---|---|
| Amount of n-propanol (parts by weight) | 40 | 80 | 100 | 130 | 160 | 230 | 280 | 400 | 500 | 800 |
| Pulling-up rate | | | | | | | | | | |
| 1 cm/min. | ΔΆ | ΔΆ | ▲ | ○ | ○ | ○ | ○ | ○ | ○ | ○ |
| 3 cm/min. | ΔΆ | ΔΆ | ΔΆ | ▲ | ▲ | ○ | ○ | ○ | ○ | ○ |
| 6 cm/min. | ΔΆ | ΔΆ | ΔΆ | ▲ | ▲ | ○ | ○ | ○ | ○ | ○ |

Figure 8:
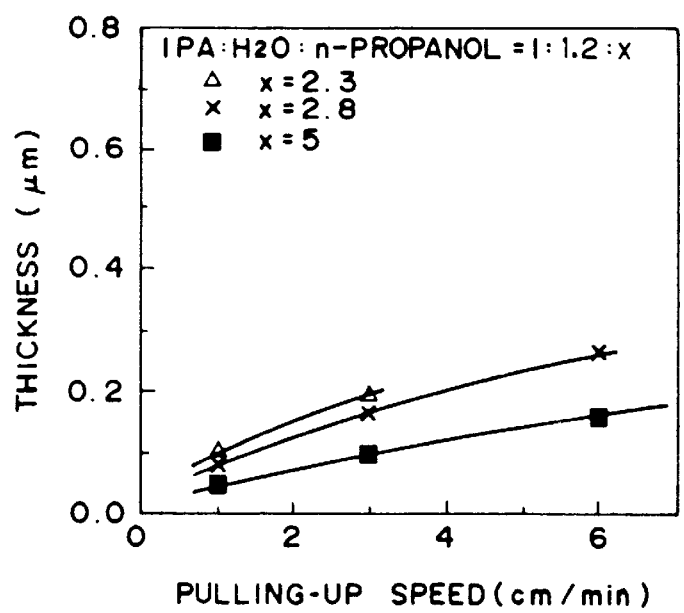

Solution G was diluted with the amounts of n-propanol shown in TABLE 8 to obtain the peroxotungstic acid solutions No.58 to No. 67. TABLE 8 also shows the relation between the pulling-up speed (cm/min) and the state of the reduction coloring layer when each of the peroxotungstic acid solutions No. 58 to No. 67 was used in the dip coating method. FIG. 8 shows the relation between the pulling-up speed (cm/min) and the thickness of the reduction coloring layer ($\mu$m) when some of the peroxotungstic acid solutions were used in the dip coating method.

TABLE 8

| Solution No. | 58 | 59 | 60 | 61 | 62 | 63 | 64 | 65 | 66 | 67 |
|---|---|---|---|---|---|---|---|---|---|---|
| Amount of n-propanol (parts by weight) | 40 | 80 | 100 | 130 | 160 | 230 | 280 | 400 | 500 | 800 |
| Pulling-up rate | | | | | | | | | | |
| 1 cm/min. | ΔΆ | ΔΆ | ▲ | ○ | ○ | ○ | ○ | ○ | ○ | ○ |
| 3 cm/min. | ΔΆ | ΔΆ | ΔΆ | ▲ | ▲ | ○ | ○ | ○ | ○ | ○ |
| 6 cm/min. | ΔΆ | ΔΆ | ΔΆ | ▲ | ▲ | ▲ | ○ | ○ | ○ | ○ |

As seen from TABLES 2 to 8 and FIGS. 2 to 8, a peroxotungstic acid solution containing 100 parts by weight of IPA powder, not more than 120 parts by weight of water and not less than 80 parts by weight of n-propanol as an organic solvent can effectively prevent unevenness in and separation of the reduction coloring layer. It is also found that the peroxotungstic acid solution containing 100 parts by weight of IPA powder, 20 to 120 parts by weight of water, and 80 to 800 parts by weight of n-propanol as an organic solvent can effectively prevent unevenness in and separation of the reduction coloring layer.

(Test 2)

Other organic solvents for the reduction coloring layer composition (peroxotungstic acid solution) were investigated.

First, IPA powder was first synthesized by the same method as that employed in the Example. The thus-synthesized power was dissolved in pure water to obtain solution B having the composition in parts by weight shown in TABLE 1.

Figure 9:
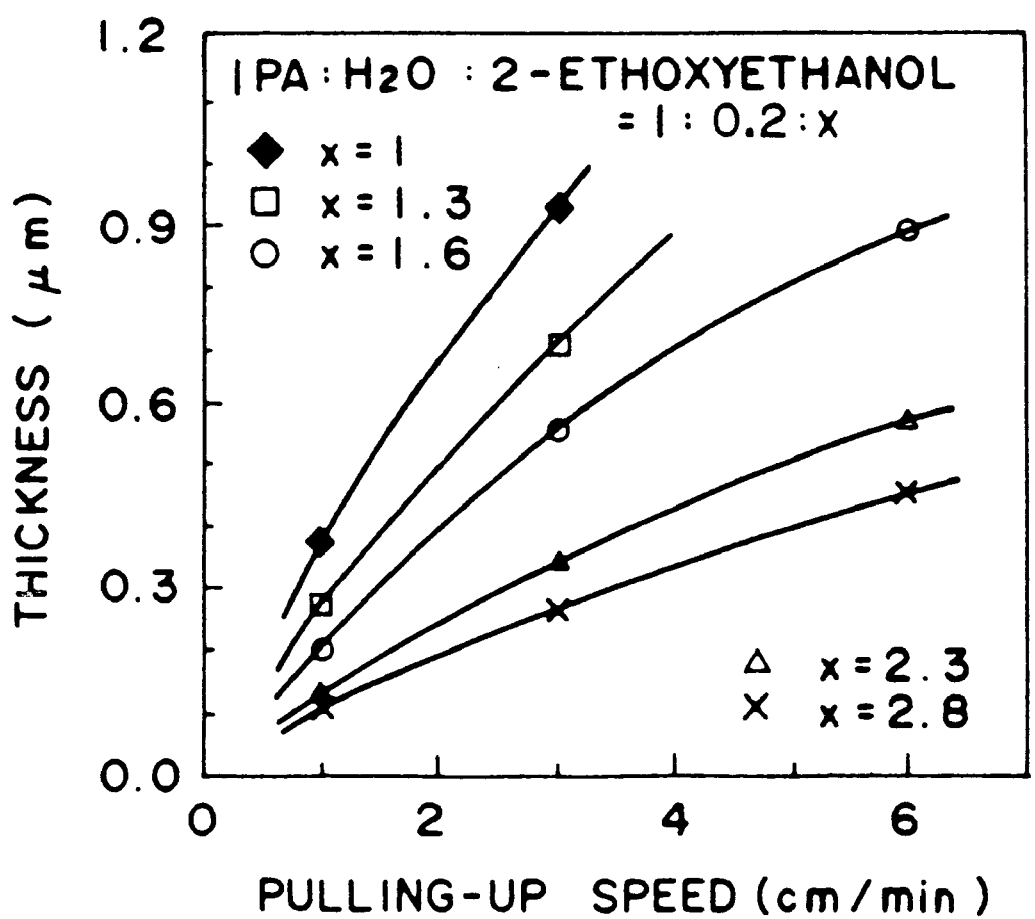

Solution B was diluted with the amounts of 2-ethoxyethanol shown in TABLE 9 to obtain the peroxotungstic acid solutions No. 68 to No. 77. TABLE 9 also shows the relation between the pulling-up speed (cm/min) and the state of the reduction coloring layer when each of the peroxotungstic acid solutions No. 68 to No. 77 was used in the dip coating method. FIG. 9 shows the relation between the pulling-up speed (cm/min) and the thickness of the reduction coloring layer ($\mu$m) when some of the peroxotungstic acid solutions were used in the dip coating method.

TABLE 9

| Solution No. | 68 | 69 | 70 | 71 | 72 | 73 | 74 | 75 | 76 | 77 |
|---|---|---|---|---|---|---|---|---|---|---|
| Amount of 2-ethoxyethanol (parts by weight) | 40 | 80 | 100 | 130 | 160 | 230 | 280 | 400 | 500 | 800 |
| Pulling-up rate | | | | | | | | | | |
| 1 cm/min. | ΔΔ | ▲ | ○ | ○ | ○ | ○ | ○ | ○ | ○ | ○ |
| 3 cm/min. | ΔΔ | ▲ | ○ | ○ | ○ | ○ | ○ | ○ | ○ | ○ |
| 6 cm/min. | ΔΔ | ΔΔ | ▲ | ○ | ○ | ○ | ○ | ○ | ○ | ○ |

It can be understood from TABLE 9 and FIG. 9 that 2-ethoxyethanol can be used as the organic solvent.

Although dimethylformamide can be used as the organic solvent, the results of the tests performed by the inventors showed that dimethylformamide is difficult to use because the composition containing dimethylformamide produces a precipitate of the IPA powder within several hours.

Although the above Example and Tests 1 and 2 employ the wet dip coating method for coating the composition, the composition of the present invention can be applied to other wet methods. However, when a wet spin coating method is executed, an EC device can be produced without significant increase in the production cost only when a substrate of about 30 cm square is rotated, and generally difficulties arise in producing a larger EC device at low cost.

Although the above Example and Tests 1 and 2 each relates to an EC device of chromatic devices, the application of the composition of the present invention is not limited to the EC device, and the composition can be applied to other chromatic devices such as thermochromatic devices, photochromatic devices and so on, which have a reduction coloring layer comprising an oxide of at least one of W, Nb, Mo and V.

As described above, the coloring layer composition for a chromatic device according to the present invention is constructed as described in each of the Claims, and thus the composition can effectively prevent the occurrence of unevenness in and separation of the coloring layer produced by a wet method such as the dip coating method.

The use of this composition thus improves the utility of the wet method such as the dip coating method, and permits reliable production of a large chromatic device at low cost.

What is claimed is:

1. A method of producing a chromatic device having a first transparent substrate, a first transparent electrode layer, a reduction coloring layer, an electrolyte layer, an oxidation coloring layer, a second transparent electrode layer and a second transparent substrate, which are successively laminated, said method comprising a reduction coloring layer forming step for forming said reduction coloring layer on said first transparent electrode layer;

wherein said reduction coloring layer forming step employs a dip coating method for forming a film on said first transparent electrode layer by using a coloring layer composition comprising a solute comprising a metal oxide-containing compound selected from the group consisting of $WO_3.aNb_2O_5.bH_2O_2.cH_2O$, $WO_3.aMoO_2.bH_2O_2.cH_2O$, $MoO_2.aNb_2O_5.bH_2O_2.cH_2O$, $WO_3.aNb_2O_5.bMoO_2.cH_2O_2.dH_2O$, and $V_2O_5.aH_2O_2.bH_2O$ (wherein a, b, c and d are each zero or a positive number), water for dispersing and holding said solute, and an organic solvent compatible with water, the vertical pulling-up speed being less than 15 cm/min.

2. A method of producing a chromatic device according to claim 1, wherein said reduction coloring layer forming step employs a dip coating method for forming a film on said first transparent electrode layer by using said coloring layer composition containing 20 to 30% by weight of $WO_3.aNb_2O_5.bH_2O_2.cH_2O$ (wherein a, b and c are each zero or a positive number) as said solute, the vertical pulling-up speed being less than 10 cm/min.

* * * * *

UNITED STATES PATENT AND TRADEMARK OFFICE
CERTIFICATE OF CORRECTION

PATENT NO. : 5,997,776
DATED : December 7, 1999
INVENTOR(S) : Toshiki INOUE et al.

It is certified that error appears in the above-identified patent and that said Letters Patent is hereby corrected as shown below:

Title page, at "[54]", change the title to --METHOD OF PRODUCING CHROMATIC DEVICE BY USING COLORING LAYER COMPOSITION--.

Title page, at "[73] Assignee:", line 2, change "Aichi" to --Aichi-ken--.

Column 1, lines 1-4, change the title to --METHOD OF PRODUCING CHROMATIC DEVICE BY USING COLORING LAYER COMPOSITION--; line 39, change "some" to --same--.

Column 4, line 24, change "weights" to --weight--.
Column 6, line 43, change "peroxotungatic" to --peroxotungstic--

Column 7, line 13, change "n-propenol" to --n-propanol--.

Column 8, first row of TABLE 6, change "47k" to --47--.

Column 9, first row of TABLE 6, change "47k" to --47--.

Column 10, line 37, change "power" to --powder--.

Signed and Sealed this

Thirteenth Day of February, 2001

*Attest:*

NICHOLAS P. GODICI

*Attesting Officer*     *Acting Director of the United States Patent and Trademark Office*

UNITED STATES PATENT AND TRADEMARK OFFICE
CERTIFICATE OF CORRECTION

PATENT NO. : 5,997,776
DATED : December 7, 1999
INVENTOR(S) : Toshiki Inoue et al.

It is certified that error appears in the above-identified patent and that said Letters Patent is hereby corrected as shown below:

<u>Column 5,</u>
Line 5, correct the formula to read -- $WO_3 \cdot 0.041\ Nb_2O_5 \cdot O.6H_2O_2 \cdot 3H_2O$ --;

Signed and Sealed this

Thirtieth Day of April, 2002

*Attest:*

JAMES E. ROGAN
*Attesting Officer*     *Director of the United States Patent and Trademark Office*